(12) United States Patent
Giroir

(10) Patent No.: US 6,535,923 B1
(45) Date of Patent: Mar. 18, 2003

(54) METHOD AND SYSTEM FOR DEFINING AN EFFICIENT AND RELIABLE MESHING OF CP-CP SESSIONS IN AN ADVANCED PEER TO PEER NETWORK

(75) Inventor: Didier Giroir, Cagnes sur Mer (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/510,184

(22) Filed: Feb. 22, 2000

(30) Foreign Application Priority Data

Mar. 30, 1999 (EP) .............................. 99480014

(51) Int. Cl.[7] .......................................... G06F 15/173
(52) U.S. Cl. ....................... 709/241; 709/239; 709/240; 709/241; 370/235; 370/238; 370/240
(58) Field of Search ................................ 709/239, 240, 709/241; 370/235, 238, 240, 254; 379/221.03

(56) References Cited

U.S. PATENT DOCUMENTS

| | | | | | |
|---|---|---|---|---|---|
| 6,016,306 | A | * | 1/2000 | Le Boudec et al. | 370/235 |
| 6,088,333 | A | * | 7/2000 | Yang et al. | 370/238 |
| 6,256,295 | B1 | * | 7/2001 | Callon | 370/254 |
| 6,411,701 | B1 | * | 6/2002 | Stademann | 379/221.03 |

* cited by examiner

Primary Examiner—Patrice Winder
Assistant Examiner—Thu Ha Nguyen
(74) Attorney, Agent, or Firm—David R. Irvin

(57) ABSTRACT

The present invention is directed to a method for defining a meshing of node to node connections in a communication network comprising a plurality of nodes interconnected with transmission links or parallel transmission groups, each parallel transmission group comprising a plurality of links.

8 Claims, 7 Drawing Sheets

Advanced Peer-to-Peer Networking With Three Nodes

MESHING

Network Design Algorithm

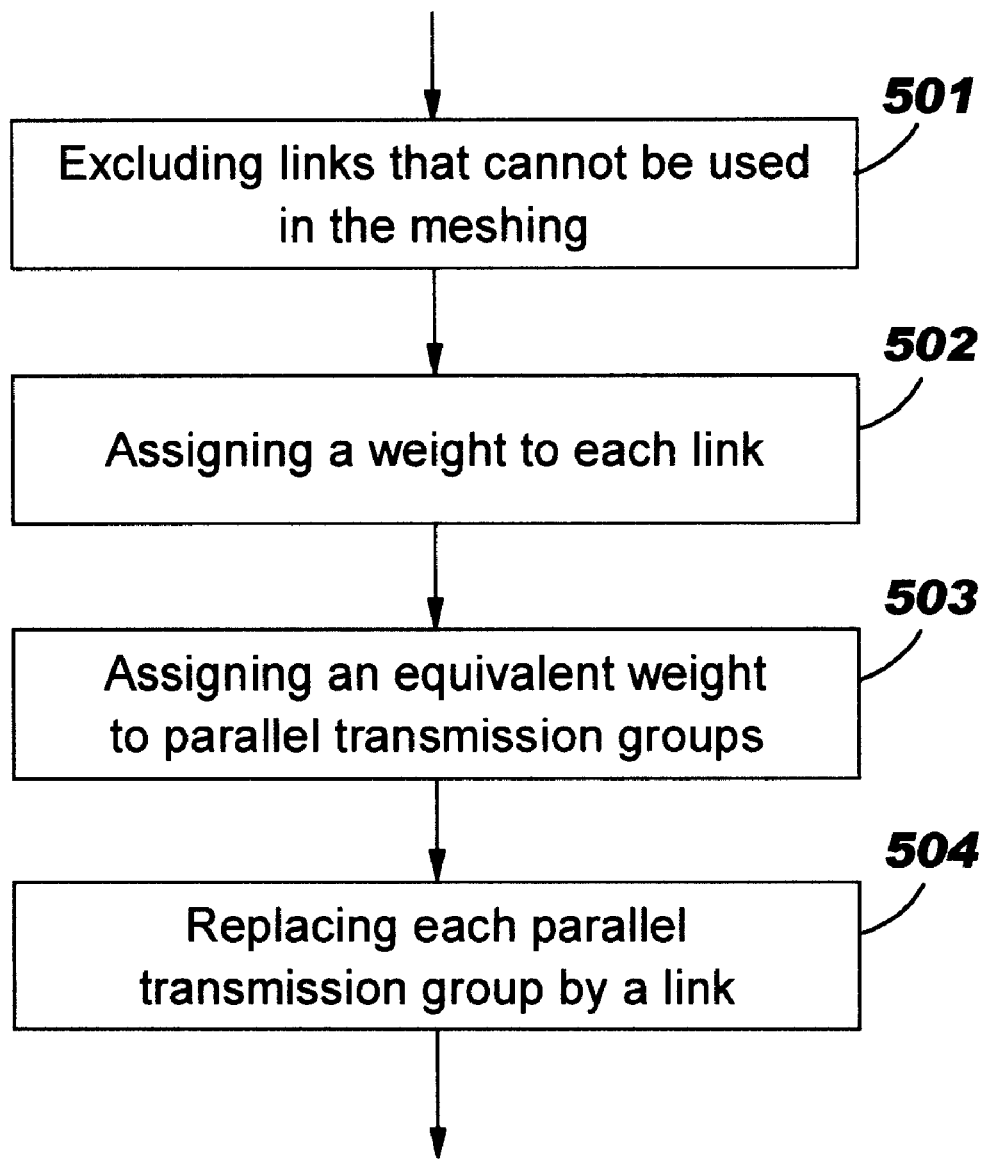

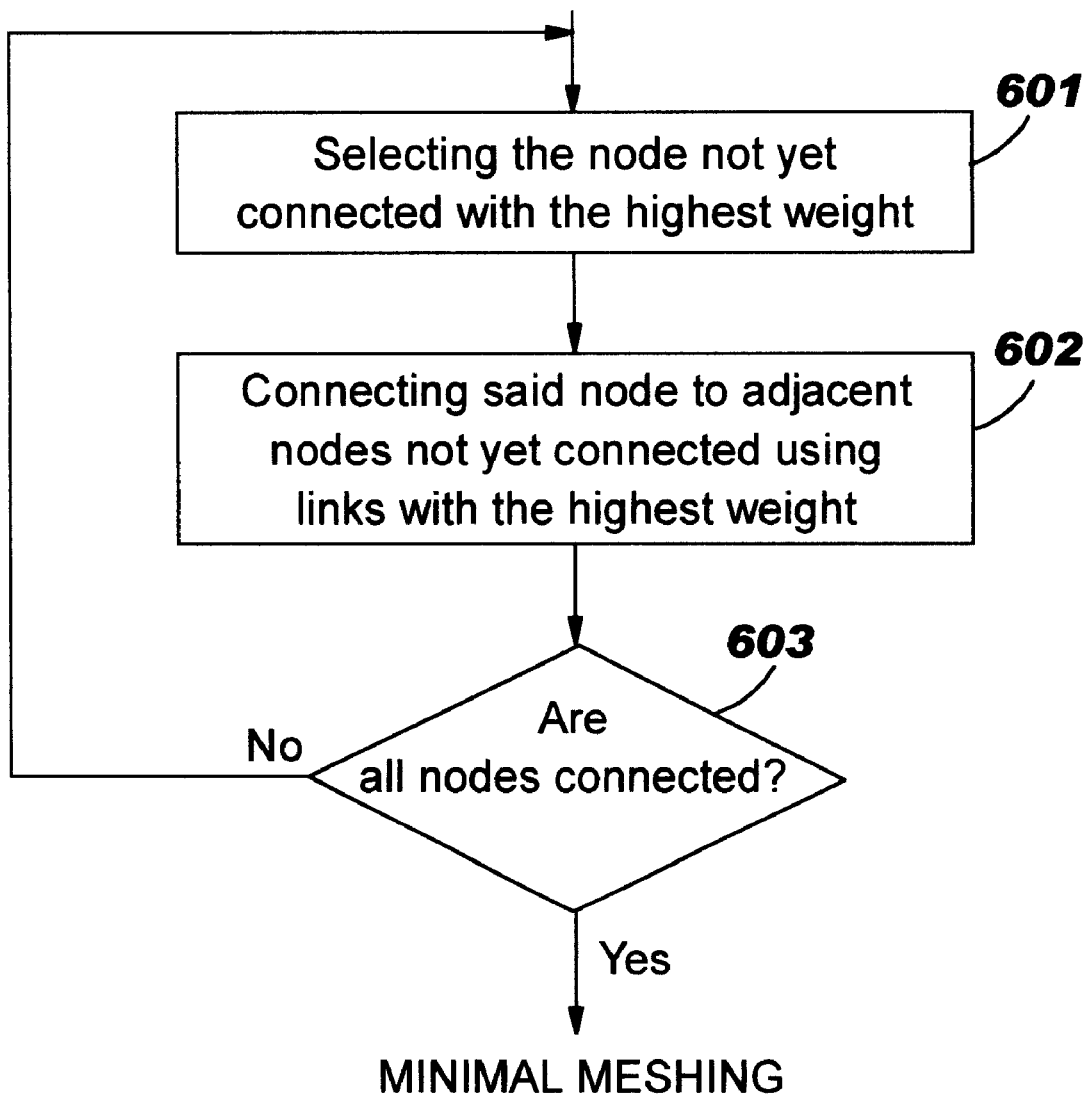

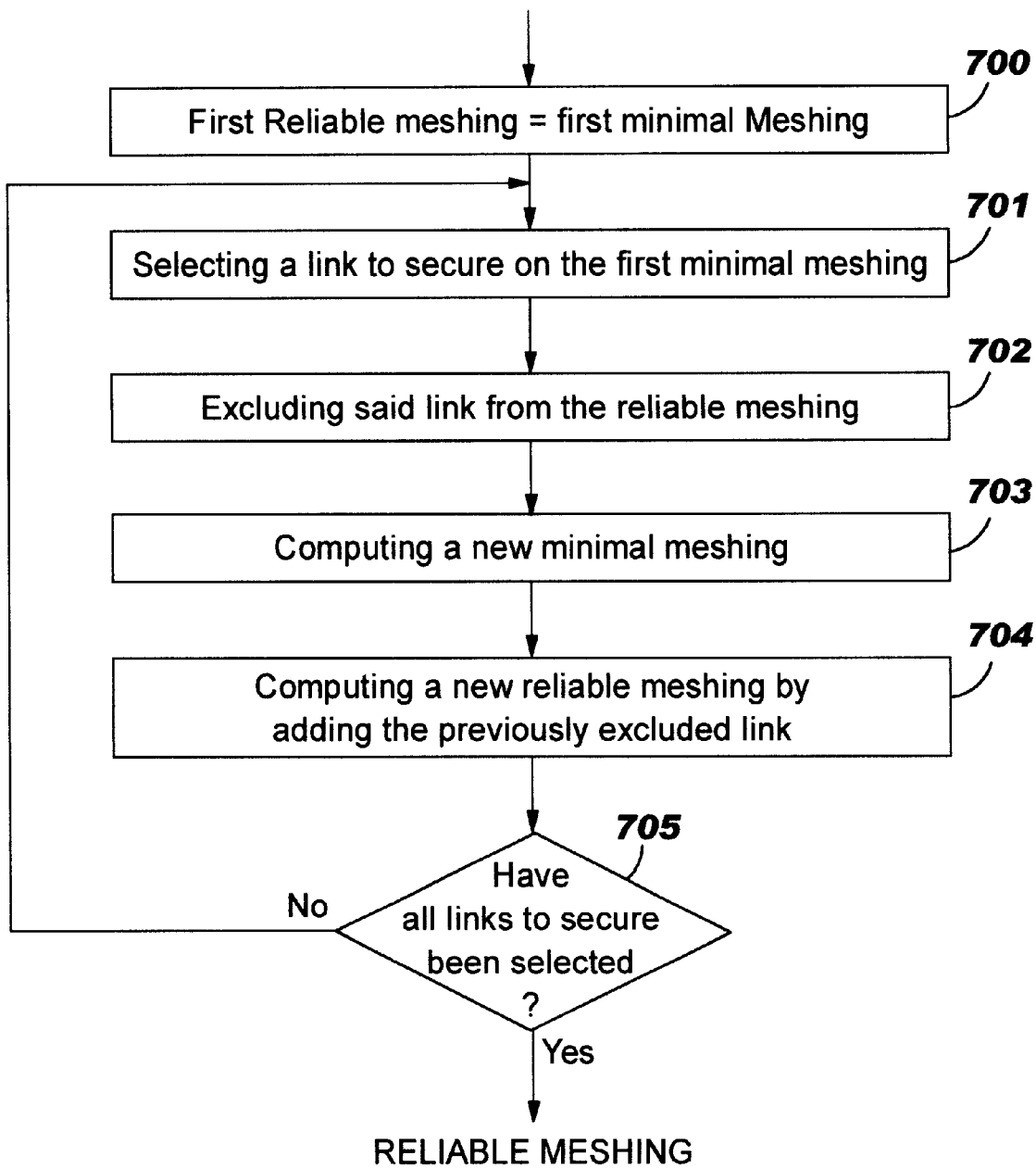

METHOD AND SYSTEM FOR DEFINING AN EFFICIENT AND RELIABLE MESHING OF CP-CP SESSIONS IN AN ADVANCED PEER TO PEER NETWORK

TECHNICAL FIELD OF THE INVENTION

The present invention relates to digital communication networks, and more particularly to a method and system to facilitate the network designer's task of predefining an efficient and reliable inter-node meshing of Control Point to Control Point (CP-CP) sessions for an Advanced Peer to Peer Networking (APPN) network.

BACKGROUND ART
ADVANCED PEER TO PEER NETWORKING (APPN)

Advanced Peer to Peer Networking (APPN) is an architecture for the enhanced use of dynamic topology mechanisms and dynamic directory services. Unlike the Subarea protocols of Systems Network Architecture (SNA), APPN allows for dynamic address resolution, route determination and Logical Unit (LU) registration. The static routes and Logical Unit (LU) definitions of Subarea SNA are replaced by the dynamic topology and route determination of APPN.

APPN is a structured communication architecture. The components of an APPN node are described and the interface between components within nodes are defined in order to provide a method for creating an APPN node. The APPN architecture has defined three types of nodes. Each of these types provides a different level of support for the APPN architecture.

A first type of node is a Low Entry Networking or LEN node. A LEN node is a migration path from the Subarea SNA network architecture. This type of node allows Subarea devices to be connected to APPN nodes while not requiring the devices to implement any APPN logic. This migratory path allows the Subarea devices to connect to APPN nodes as LEN nodes. Although definitions within the device and within the APPN node the LEN node attaches to are required for this connection, the LEN node is a rudimentary gateway into the APPN network.

A second type of node is an End Node or EN. The End Node (EN), as the name implies, is at the outer perimeter of an APPN network. The application LUs are normally located on the ENs. For this reason, VTAM mainframes often migrate into End Nodes (Ens) when migrating from Subarea to APPN. The EN provides all APPN services except for intermediate node routing and network topology; these functions are those of a Network Node (NN). The EN does provide such functions as: Control Point to Control Point (CP-CP) session support; and participation in directory searches. By not providing complete directory services, routing and route calculation capabilities, the overhead of these tasks, as implemented in a Network Node, is reduced. This extra capacity is thus available to be utilized for the processing of the associated LUs and their related transaction programs.

Network Node (NN):

The enhanced services of an APPN network are realized through the Network Node (NN). The Network Node provides all the services of an End Node (EN) but includes full routing, topology, and directory services capabilities. It is through these services that the dynamic benefits of APPN are gained. The Network Node (NN) provides support for its affiliated End Nodes (ENs). It is then called the NN Server (NNS) of the affiliated ENs.

The heart of the APPN node is the Control Point (CP). The CP provides the actual management and interface to other APPN nodes. The CP is where the APPN protocol is actually implemented. The Control Point to Control Point (CP-CP) session is the foundation of APPN. Through these sessions, Network Nodes communicate control information and gain awareness of their neighbors and, from them, the awareness of the rest of the APPN network. CP-CP sessions between adjacent APPN nodes always come by pairs. Each session is unidirectional (the two sessions are in the opposite direction) and is persistent. There are two types of CP-CP session pairs, between two Network Nodes and between End Nodes and their Network Node Servers. CP-CP session pairs between an End Node and its Network Node Server are not addressed by this invention and will not be discussed further.

More information concerning APPN can be found in the following publications incorporated herewith by reference:

"SNA, APPN, HPR & TCP/IP Integration", David G. Matusow, McGraw-Hill Series on Computer Communications, 1996.

"Inside APPN—The Essential Guide to the Next Generation SNA", IBM International Technical Support Organization, SG24-3669-03, Fourth Edition, Jun. 1997.

CONTROL POINT TO CONTROL POINT SESSION PAIRS

The Advanced Peer to Peer Networking (APPN) architecture defines and makes use of a controlled logical meshing of the multiple APPN Network Nodes (NN) which compose an APPN network. This meshing is used by the APPN Network Nodes for the exchange of the network control information (such as the network topology information or queries for locating resources) that any network must transport to assure proper and useful functioning of the said network. This network control information is used by the Control Points (CP) of the network nodes to locate resources (typically Logical Units) across the network and to establish efficient communication (typically sessions between Logical Units) between these resources. The exchange of network control information between the Control Points takes place from the time the nodes are brought up and activate their connections (links) to the network and lasts as long as these nodes stay up and are physically connected to the network. Directly physically interconnected network nodes, called adjacent nodes in the sense that there are no intermediate network nodes in between them, establish over one of their common links (There could be many of these links, for reliability, capacity or cost reasons as multiple low-speed links may be less expensive than a higher capacity link), a pair of unidirectional network control connections, one per direction of flow. Each of these network control connections is called in the APPN parlance a (unidirectional) "Control Point to Control Point session" (CP-CP session). A pair of these CP-CP sessions (always in the opposite direction) is called a (bidirectional) "CP-CP session pair". A CP-CP session pair couples the Control Points (CPs) of adjacent network nodes and allows bidirectional exchange of network control information between said Control Points (CPs).

The APPN architecture specifies a maximum (and defines the protocols to insure this) of one CP-CP session pair between any two adjacent nodes whatever the number of parallel links (called Parallel Transmission Groups) between the two adjacent nodes. However, a node can have any number of CP-CP session pairs to different adjacent nodes. A failure of the CP-CP connectivity (for example if the link fails) triggers the setup of an alternate CP-CP session pair on an available parallel link, if one exists with the capability to carry CP-CP session pairs. However, the capability for a link to support the setup of CP-CP session pairs remains optional and is based on the decision of the network designer who defines the link capabilities and optionally enables the support of a CP-CP session pair for this link. What is however specified by the APPN architecture is that, for the network to function properly, every individual network node must at any time be connected to the network it belongs to via at least one CP-CP session pair. Nodes and/or set of interconnected nodes not connected to the network, intentionally or because of a temporary failure on a session pair (because for example of a link outage), immediately result in the splitting of the network in disjoint partitions and therefore lead to a loss of connectivity for the exchange of network control information.

Such a loss of connectivity results in a de-synchronization of the network control information between the created partitions. While the APPN architecture has defined means to allow for an optimized re-synchronization between partitions that join (for example when the link outage is circumvented), there is always a period during which the network node's individual knowledge of topology information are desynchronized. This results in temporary loss of connectivity or in the setting of sub-optimized routes (as the latest network topology is not available).

Among the characteristics associated to an APPN link, is the capability for the link to support a CP-CP session pair. When parallel links (also called parallel Transmission Groups) are available between two Network Nodes (NN) and some or all of these have been defined as enabled for CP-CP session pairs, the first enabled link that is activated is selected for supporting the single CP-CP session pair between the adjacent Network Nodes.

Selecting eligible links to be used for CP-CP session pairs is a network designer's problem and is not an easy one. Consequences of bad choices may have significant effects on the network behavior in terms of reliability and performances. The APPN architecture disseminates the network control information over all the network links that carry CP-CP session pairs. Each network control message issued by any node within the network, flows at least once over each link transporting a CP-CP session pair and therefore is transmitted to every network node within the network. The spectrum of choices for defining a logical meshing of CP-CP session pairs ranges between two extreme possibilities: Maximum meshing and minimum meshing. A maximum meshing where all links are defined as being usable to transport CP-CP session pairs. A minimum meshing that insures the connection of all Network Nodes to the network with the establishment of a minimum number of CP-CP session pairs. The effects that such extreme choices have on the network behavior will now be discussed.

MAXIMUM MESHING

There is an obvious solution to minimize undesirable behaviors (disjoined partition of the network, de-synchronization of network control information) in case of link failures. This solution consists in letting the network designer define every link as a candidate for carrying a CP-CP session pair. While this solution does make a lot of sense for small networks with low connectivity between network nodes, this solution is certainly undesirable in an highly meshed environment in particular because of two undesirable side effects. First, the overhead induced by the network control flows (which could really be significant in a large APPN network) is replicated over all the links within the network that carry a CP-CP session pair. Second, while there are some APPN protocols that were developed to insure a network control message is only processed once by a network node, the network nodes are interrupted, just to discover that the network control messages they just received are replicates that have already been processed. Also, the same message must be replicated by the sender onto all the links over which this network node has a CP-CP session pair active, which leads to unnecessary overhead.

This is the more reliable solution but with the highest overhead. Even in this extreme case, not all links are carrying a CP-CP session pair in a running network as only one single pair at a time can exist between a pair of adjacent nodes. Note: In case of parallel links, when one of the links has been defined as eligible to carry a CP-CP session pair, defining one or multiple parallel links as also eligible does not create more control traffic overhead across the network but improves reliability.

MINIMUM MESHING

In this case, the network designer insures there is a minimum number of CP-CP session pairs across the whole network. While this meshing configuration completely eliminates all the undesirable side effects of the "Maximum Meshing" solution, the drawback is that the failure of a link immediately involves the creation of disjoined partitions of the network. The network partitions will stay disjoined until the link recovers. This is the less reliable solution but with the lowest overhead.

The selection of a logical meshing of CP-CP session pairs across the network is always a compromise between the network reliability and the network overhead induced by the network control traffic. The problem is to define a logical meshing of CP-CP session pairs that offers an acceptable compromise between the network control traffic overhead and the network reliability.

SUMMARY OF THE INVENTION

It is one purpose of the present invention to define a reliable meshing of CP-CP session pairs, taking into consideration the possibility of single link failures and optionally the possibility of a node failure.

While preserving the reliability objective, it is a further purpose of the present invention to have as few CP-CP session pairs as possible across the network to minimize as much as possible the amount of unnecessary redundant control information that the network must transport and that the network nodes must process. The objective is to reduce the network overhead.

In accomplishing these purposes, the present invention is directed to a method and system for defining an efficient and reliable meshing of node to node connections in a communication network comprising a plurality of nodes interconnected with transmission links or parallel transmission groups, each parallel transmission group comprising a plurality of links.

DRAWINGS

The novel and inventive features believed characteristic of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

FIG. 5 is a flow chart of the step of assigning a link weight according to the present invention.

FIG. 6 is a flow chart of the step of defining a minimal meshing according to the present invention.

FIG. 7 is a flow chart of the step of defining a reliable meshing according to the present invention.

PREFERRED EMBODIMENT OF THE INVENTION

ADVANCED PEER TO PEER NETWORKING

APPN Nodes

As expressed hereinabove, the APPN architecture defines three basic node types: Low Entry Nodes; End Nodes; and a Network Node.

A Low Entry Node or LEN provides peer to peer connectivity to other LENs, APPN End Nodes or APPN Network Nodes. A LEN requires that all network accessible resources, either controlled by the LEN itself or on other nodes, be defined at the LEN. Unlike End Nodes, the LEN cannot establish CP-CP sessions with a Network Node. A LEN therefore cannot register resources at a Network Node Server. It does however indirectly use the distributed directory and routing services of an adjacent Network Node.

The APPN End Node is similar to a LEN, except that the Control Point (CP) of the End Node exchanges information with the CP in the adjacent Network Node using the CP-CP session pair. The communication over the CP-CP sessions reduces the need for network definitions, and thus makes installation and maintenance of the network easier. The APPN End Node provides limited directory and routing services for its local Logical Units (LUs). It can select an adjacent APPN network node and request this network node to be its Network Node Server. If accepted by the network node, the APPN End Node may register its local resources at the Network Node Server. The APPN End Node may have active connections to multiple adjacent network nodes. At any given moment, however, only one of the Network Nodes can be acting as its Network Node Server. The APPN End Node establishes CP-CP sessions with a network node to select that Network Node as its Network Node Server.

The APPN Network Node has intermediate routing functions and provides network services to either ENs or LENs that are attached to it. It establishes CP-CP sessions with its adjacent APPN Network Nodes to exchange network topology and resource location information. CP-CP sessions between an APPN Network Node and an adjacent APPN End Node are required only if the APPN End Node is to receive network services (such as the partner location determination) from the APPN Network Node. An APPN Network Node provides distributed directory and routing services for all the LUs that it controls. These LUs may be located on the APPN network node itself, on one of the adjacent LEN or on any of the APPN End Nodes for which the APPN Network Node provides network node services. Jointly, with the other active APPN Network Nodes, an APPN Network Node is able to locate all destination LUs known in the network.

The APPN architecture also describes the connection of LENs to Network Nodes or End Nodes.

Figure 1:
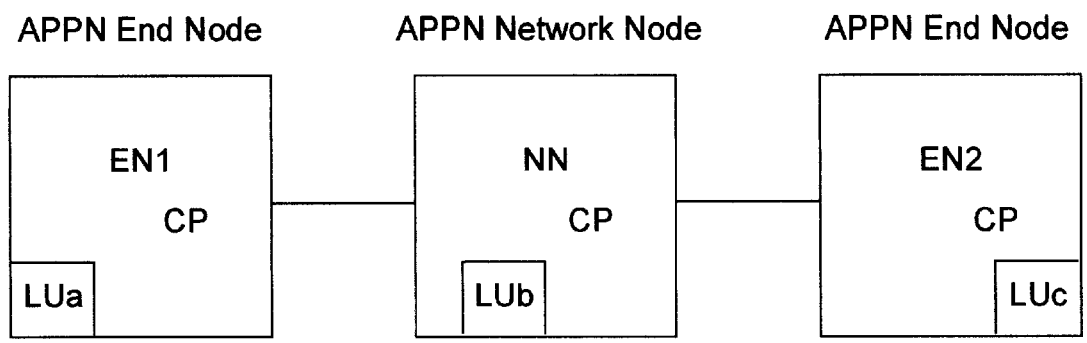
FIG. 1 shows a basic form of an APPN network.

FIG. 1 shows the basic form of an APPN network and gives an example of the services provided by the APPN Network Node. When LUa requests a session with LUc, the network node will locate the partner LU and assist in establishing the session. However, APPN networks can be much more complex. The architecture does not limit the number of nodes in an APPN network nor does it explicitly limit the number of intermediate APPN Network Nodes through which LU-LU sessions are routed.

Figure 2:
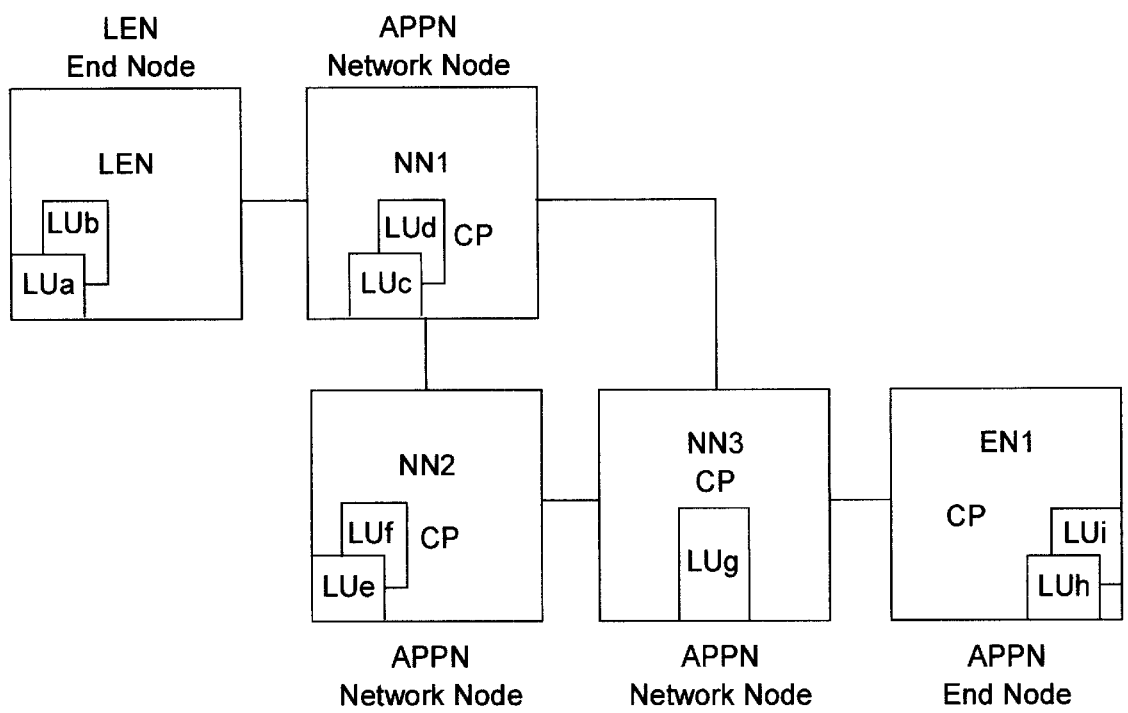
FIG. 2 shows a backbone structure of APPN Network Nodes to which End Nodes connect.

FIG. 2 shows a backbone structure of APPN network nodes to which end nodes connect. The APPN nodes communicate using CP-CP sessions between adjacent nodes. User sessions can be established from any LU to any LU. A Logical Unit (LU) serves as a port into the network and acts as an intermediary between the end user and the network. The LU is engaged in session establishment with one or more partner LUs and manages the exchange of data with the partner LU. LUs on ENs or NNs and LUs on LENs can accept session initialisation requests from other LUs or initiate those sessions themselves.

The Control Point (CP) is responsible for managing the node and its resources. It creates Path Control (PC), Transmission Control (TC), and Data Link Control (DLC) components. The CP also manages session resources and provides facilities such as directory and topology information. The CP is created by the Node Operator Facility (NOF) when the node is started. The Control Point (CP) activates links to adjacent nodes, exchanges CP capabilities when establishing the CP-CP session pairs with adjacent nodes, and interacts with the node operator through the Node Operator Facility (NOF). For its local LUs, the Control Point finds the partner LU's location and provides routing information. The services of the Control Point can be categorized as follows: Configuration Services; Topology and Routing Services; Directory Services; Session Services; Address Space Manager; and Management services.

Session Services

The session services are responsible for activating and deactivating the CP-CP sessions that are used by the Control Points to exchange network information. It is also responsible for maintaining and assigning unique session identifiers to sessions and assisting Logical Units (LUs) in activating and deactivating LU-LU sessions.

To perform directory services, session services, and topology and routing services, adjacent nodes throughout the APPN network use pairs of parallel CP-CP sessions to exchange network information. Both sessions must be active in order for the partner CPs to begin or continue their interactions.

Once CP-CP sessions are established, the capabilities of the Control Points are exchanged.

Network Nodes use CP-CP sessions to keep track of the network topology and also for directory, session services, and management. A Network Node establishes CP-CP sessions with (selected) adjacent nodes and with each client APPN End Node. It is recommended for a Network Node not to establish CP-CP sessions with every adjacent Network Node (for example, when a large number of Network Nodes is connected to a shared-access transport facility like a Local Area Network (LAN)). An APPN End Node establishes sessions with a single adjacent Network Node acting as its current server. CP-CP sessions cannot be established between APPN End Nodes. A LEN Node does not support CP-CP sessions.

CP-CP sessions are used to conduct directory searches. In addition, End Node to Network Node CP-CP sessions may be used to register resources and to pass alerts between management services components.

During link activation, the APPN Network Nodes indicate whether they support CP-CP sessions to particular APPN nodes on the link. This is the link eligibility to carry a CP-CP session pair. During link activation APPN End Nodes indicate whether or not they support CP-CP sessions, or whether they support and request CP-CP sessions, over the link. APPN end nodes may defer the establishment of CP-CP sessions, for example if they want to select a Network Node server at a later time.

MESHING OF CP-CP SESSION PAIRS (Network Design Algorithm)

The present invention relates to an algorithm that can be used as a design tool for an Advanced Peer to Peer Networking (APPN) network of any size. This tool is used to help the network designer to define an efficient and reliable CP-CP session pairs meshing of the network. This invention proposes an algorithm that can be implemented as a software program that helps the network designer assign CP-CP session capabilities to the individual Transmission Groups within the network. This invention does not require any change to the existing SNA APPN protocols and can be used by the network designer for any existing or future APPN network. The results of the algorithm is a list of the required settings of the Transmission Groups characteristic defining the link's eligibility to carry a CP-CP session pair. This list is then exploited by the network designer to make his Transmission Group definitions within the network.

Figure 3:
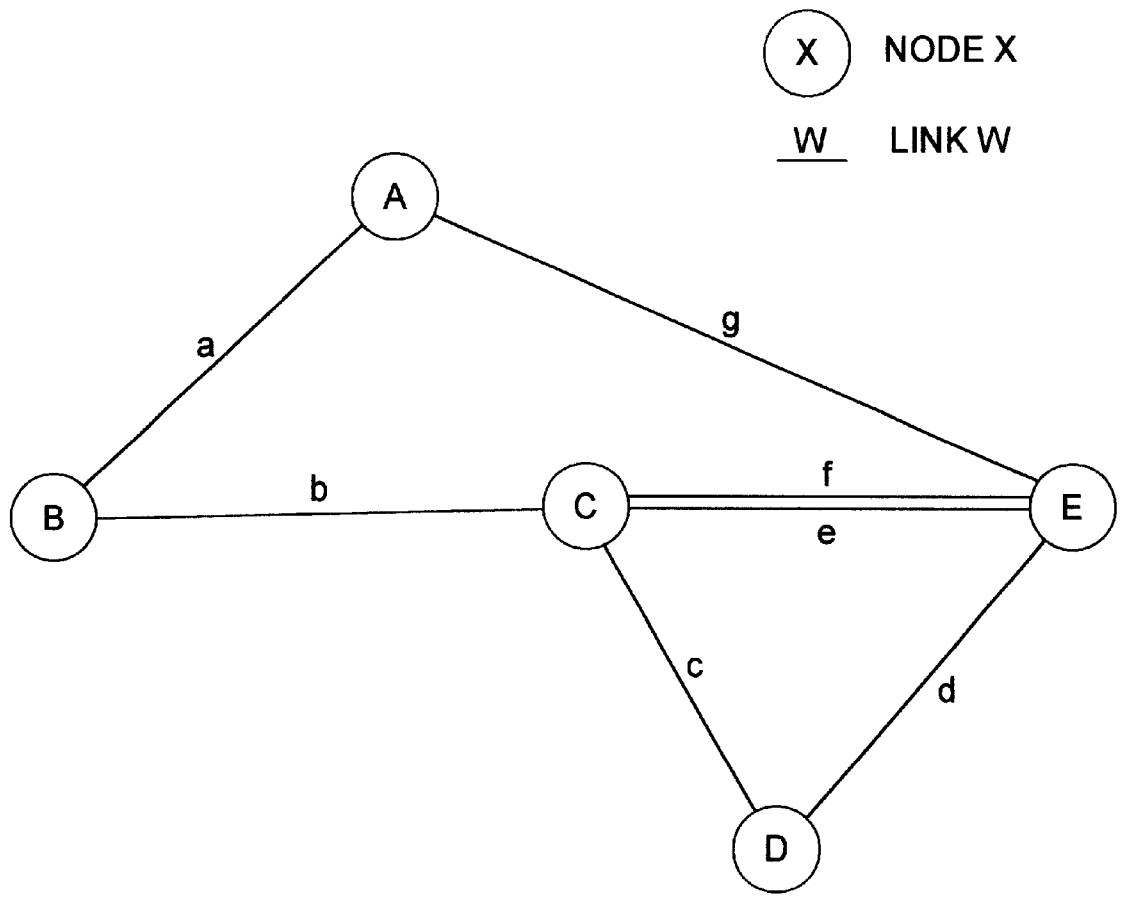
FIG. 3 shows an example of the graph used to model the APPN Network to be processed by the algorithm according to the present invention.
Figure 4:
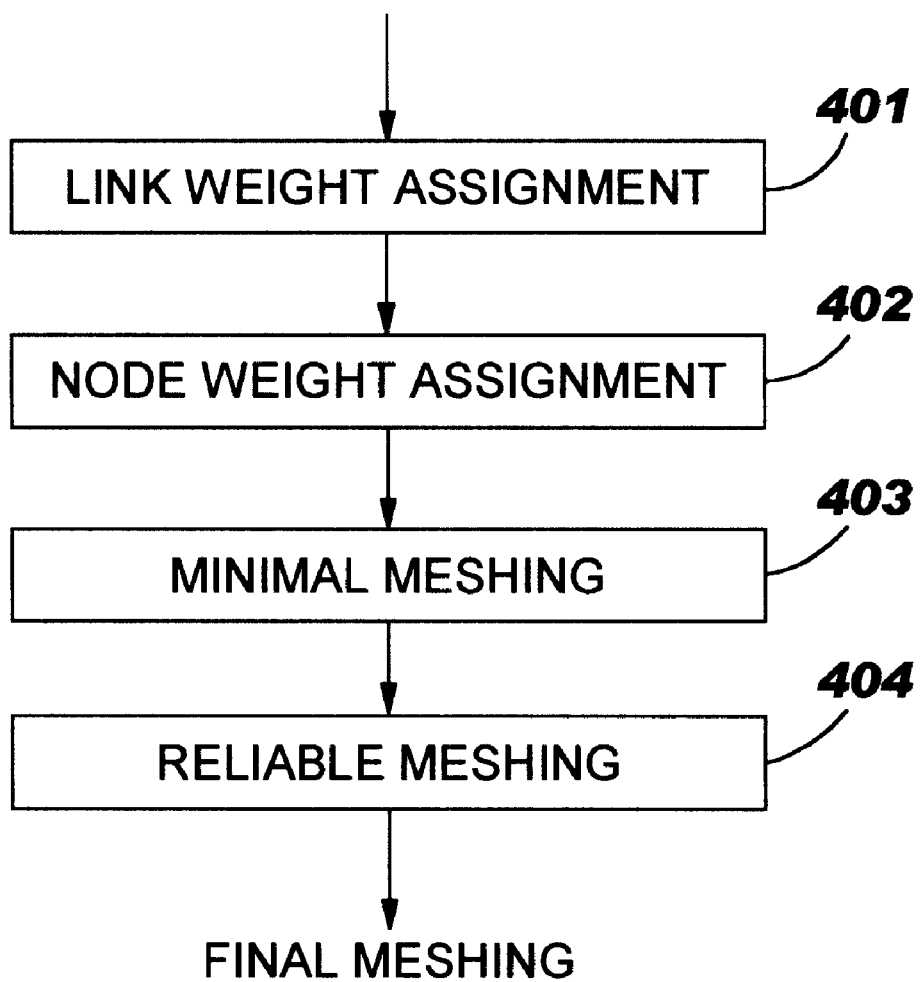
FIG. 4 is a flow chart of the algorithm according to the present invention.

The following section describes the steps executed by the network design algorithm claimed in the present application. A graph representing the APPN Network to be processed by the algorithm is used as input by the algorithm. This graph consists of Nodes (the NNs composing the APPN network) and of all the links interconnecting the nodes. FIG. 3 shows an example of such a graph, in an APPN network composed of five Network Nodes (Node A through E) and seven links (link a to link g). FIG. 4 shows the logical steps composing the network design algorithm which will now be described.

Link Weight (401)

As shown in FIG. 5, the first step performed by the network design algorithm is the assignment of weights to each of the links within the graph. As an initialization step, all links are defined as not eligible to carry a CP-CP session pair.

The first operation (501) consists in pruning from the graph all the links that cannot be used for the CP-CP session pairs because the cost is prohibitive, the link is not reliable enough, the link is not usable at all times, or the network control overhead cannot be accommodated over such links. A weight of zero is assigned to such links.

The next operation (502) consists in the assignment of a "weight" (default is 1, meaning that all links are equal) to all remaining links within the network. The chosen weight could take into consideration elements such as: the security of the link, the reliability of the link, the associated cost per transported bytes, or any other rationale defined by the network designer. This weight is used by the network designer to quantify how desirable the link is for participating to the CP-CP session pair meshing. The higher this parameter, the more desirable the link is for transporting the CP-CP session pairs.

The next operation (503) consists in computing an "equivalent link weight" for all parallel Transmission Groups (TGs). The equivalent weight is obtained by summing up the weight associated to each individual link composing the parallel Transmission Group (TG). The reason why these individual weights are added is the reliability that is gained using parallel links within a parallel Transmission Group (TG). When a link transporting the CP-CP session pair within the group fails, the APPN protocols triggers the settings of another CP-CP session pair over another eligible link within the parallel Transmission Group (TG).

The last operation (504) of this step of assigning a weight to each link consists in changing the graph to replace each parallel Transmission Group (TG) by a link with a weight equivalent to the previously computed weight of said parallel Transmission Group (TG).

Node Weight (402)

The second step consists in the assignment of a weight to every Network Node. This weight is reflecting the node's processing (and optionally reliability) capabilities. Network Nodes with highest weights (highest desirable nodes) will be processed first by the network design algorithm as they have more "horsepower" than other Network Nodes with a lowest weight (default is a weight of 1).

The network design algorithm now proceeds to selecting the best links/Nodes combinations to form an optimized meshing of CP-CP session pairs.

Minimal Meshing (403)

The minimal meshing algorithm is illustrated in FIG. 6. In accordance with this algorithm, the Network Node with the highest weight still unattached to the network via a network link that has been made eligible to carry a CP-CP session pair by the algorithm is selected from the graph (601). The algorithm favors the "highest desirable node" (node with the highest weight).

Note: The first time this process is executed, the network does not yet exist (as there are no links that are eligible to carry a CP-CP session pair) and begins with a single Network Node, the Network Node with the highest weight that has just been selected.

Next, the network design algorithm proceeds (602) by joining to the network as many as possible adjacent Network Nodes that are not yet attached via a CP-CP session pair. Using the links with the highest weights first, the algorithm favors the "most desirable links" when possible. These selected links are those that are now defined by the algorithm as eligible to carry a CP-CP session pair, as such their characteristics are changed by the algorithm to "eligible to carry a CP-CP session pair".

As long as not all nodes are attached to the network via a CP-CP session pair, the Minimal Meshing algorithm is repeated (603).

Reliable Meshing (404)

At this point, a minimal meshing has been obtained. All Network Nodes are connected to the network for the distribution of the network control information. In theory this meshing is sufficient for the network to function properly (this is one of the possible instances of the minimum meshing solution). However, this process has not yet taken into account the inevitable possibilities for a link to fail. To cope with failures, as described in FIG. 7, the following steps are performed. For each link to be secured that was previously selected for transporting CP-CP session pairs, and is not part of a parallel Transmission Group (TG) (701), exclude (702) the graph from the link, repeat (703) the Minimal Meshing (403) step, and, once done, add back (704) to the graph the link that was forced to "fail", and proceed with the next link (705).

Once done, the resulting graph constitutes a reliable meshing. This simulates the effect of a link failure and a loss of a CP-CP session pair. Running the minimal meshing step (403) forces the selection of an alternate path, if none exists yet (previously added links to cope with some link failures may create sufficient redundancy to cope with the failure of other links).

Note: a link to be secured is a link that is subject to failure and for which a meshing redundancy is required.

When there is a requirement for the network to keep functioning properly in the event of a node failure, the same algorithm may be used to add the necessary redundancy to cope with such failures. This will avoid the creation of network partitions for the nodes that remain up and running. For every node within the network, the graph is changed to reflect the failure of the node (and thus to also reflect the failure of all links attached to the failing node). The resulting graph is processed to insure the graph is entirely connected for the nodes that remain up and running. This process is repeated for every node within the network.

In all cases, when a "simulated" failure of an element cannot be circumvented by the existing connectivity (partitions are created), this is a sign that additional physical connectivity is required to achieve the desired level of reliability. This information can then be used by the network designer to modify the design of the actual network.

Notes: Only single link failures are considered by the algorithm. This is the reason why when a link is forced inactive, it is considered up again in the next run of the reliable Meshing step which considers the failure of the next link. In the case where multiple links may (and inevitably) will fail at the same time (such as individual links out of a single physical high capacity trunk), these should be considered as a whole within the algorithm (i.e. forced to fail and restored to service at the same time).

Parallel links are never considered as failing since Transmission Groups should not fail as a whole.

The resulting graph from the algorithm, when terminated, contains only the links that have to be defined as eligible for CP-CP session pairs. This graph may then be used by the network designer when making the Transmission Group capabilities definitions for the network.

While the invention has been particularly shown and described with reference to a preferred embodiment, it will be understood that various changes in form and detail may be made therein without departing from the spirit, and scope of the invention.

What is claimed is:

1. A method comprising the steps of:
   computing a first minimal meshing of node to node connections in a communication network comprising a plurality of nodes interconnected with transmission links by:
   1) selecting a node not yet connected to the meshing;
   2) connecting the selected node with adjacent nodes not yet connected to the meshing;
   3) repeating steps 1) and 2) until all nodes are connected to the meshing; then
   computing a reliable meshing by:
   a. defining a first reliable meshing identical to the first minimal meshing;
   b. selecting a link on the first minimal meshing;
   c. excluding the selected link from the reliable meshing;
   d. computing a new minimal meshing according to steps 1) through 3) above;
   e. computing a new reliable meshing by adding the previously excluded link to the new minimal meshing; and then
   f. repeating steps b to f above for each link on the first minimal meshing.

2. The method according to claim 1 comprising the further steps of:
   assigning a weight to each link with the higher weight being assigned to a link more desired to be connected to the meshing;
   assigning an equivalent link weight to each parallel transmission group according to the weight assigned to each of its links; and
   replacing each parallel transmission group by a link and assigning to said link a weight equal to the weight previously assigned to the parallel transmission group.

3. The method according to claim 1 wherein said step of defining a minimal meshing comprises the further step of using links with the highest weight for connecting the selected node with the adjacent nodes not yet connected to the meshing.

4. The method according to claim 1 comprising the further step of assigning a weight to each node with a higher weight being assigned to a node more desirable to be connected to the meshing.

5. The method according to claim 4 wherein the step of defining a minimal meshing comprises the step of selecting the node not yet connected to the meshing with the highest weight.

6. The method according to claim 1 comprising the further step of first excluding links that cannot be used in the meshing.

7. The method according to claim 6 wherein the step of assigning a weight to each link comprises the further steps of assigning a weight equal to zero to said excluded links; and assigning a positive weight to other links.

8. The method according claim 1 comprising the further step of defining control point to control point (CP-CP) sessions on said node to node connections, each of said nodes being a network node comprising a control point and said communication network being an advanced peer to peer networking (APPN) network.

* * * * *